US007297729B2

(12) United States Patent
Sexton et al.

(10) Patent No.: US 7,297,729 B2
(45) Date of Patent: Nov. 20, 2007

(54) SOLVENT SYSTEM AND INK MADE THEREFROM

(75) Inventors: Martin N. Sexton, Sugar Grove, IL (US); David Godbout, Westmont, IL (US)

(73) Assignee: Sanford, L.P., Oak Brook, IL (US)

( * ) Notice: Subject to any disclaimer, the term of this patent is extended or adjusted under 35 U.S.C. 154(b) by 435 days.

(21) Appl. No.: 10/404,075

(22) Filed: Apr. 1, 2003

(65) Prior Publication Data

US 2003/0215281 A1    Nov. 20, 2003

Related U.S. Application Data

(60) Provisional application No. 60/403,828, filed on Aug. 15, 2002, provisional application No. 60/369,036, filed on Apr. 1, 2002.

(51) Int. Cl.
 C09D 11/16 (2006.01)
 B05C 21/00 (2006.01)
 B43K 5/02 (2006.01)
 B43M 11/06 (2006.01)
 C08L 33/02 (2006.01)
 C08L 61/06 (2006.01)
 C08K 5/32 (2006.01)

(52) U.S. Cl. ............... 523/161; 401/196; 401/223; 524/556; 524/611; 524/259

(58) Field of Classification Search ............ 523/160, 523/161; 524/205, 259, 508, 522, 556, 611; 401/196, 96, 223
 See application file for complete search history.

(56) References Cited

U.S. PATENT DOCUMENTS

| | | | | |
|---|---|---|---|---|
| 3,091,545 A * | 5/1963 | Adams | .................. | 428/206 |
| 3,450,663 A * | 6/1969 | Cockerham | .................. | 524/259 |
| 3,577,255 A * | 5/1971 | Petke | .................. | 106/400 |
| 3,942,903 A | 3/1976 | Dickey et al. | .................. | 401/198 |
| 4,218,251 A | 8/1980 | Sanders | .................. | 106/30 |
| 4,256,492 A * | 3/1981 | Matsumoto et al. | .................. | 106/31.37 |
| 4,296,176 A | 10/1981 | Lennon et al. | .................. | 428/407 |
| 4,367,071 A * | 1/1983 | Mizuno et al. | .................. | 503/201 |
| 4,496,258 A | 1/1985 | Tanaka et al. | .................. | 401/206 |
| 4,545,819 A | 10/1985 | Shioi et al. | .................. | 106/23 |
| 4,657,591 A | 4/1987 | Shioi et al. | .................. | 106/23 |
| 4,664,711 A * | 5/1987 | Kawaguchi et al. | .................. | 524/399 |
| 4,749,727 A | 6/1988 | Tsuchiya | .................. | 522/170 |
| 4,759,650 A * | 7/1988 | Granoff | .................. | 401/107 |
| 5,004,763 A * | 4/1991 | Imagawa | .................. | 523/161 |
| 5,037,475 A * | 8/1991 | Chida et al. | .................. | 106/403 |
| 5,338,793 A * | 8/1994 | Loftin | .................. | 524/571 |
| 5,340,388 A | 8/1994 | Breton et al. | .................. | 106/22 |
| 5,344,670 A | 9/1994 | Palmer et al. | .................. | 427/157 |
| 5,443,628 A | 8/1995 | Loria et al. | .................. | 106/20 |
| 5,474,603 A | 12/1995 | Miyashita et al. | .................. | 106/25 |
| 5,651,627 A | 7/1997 | Dowzall et al. | .................. | 401/199 |
| 5,762,694 A | 6/1998 | Yokoi et al. | .................. | 106/31.65 |
| 5,813,787 A | 9/1998 | Dowzall et al. | .................. | 401/199 |
| 5,849,072 A * | 12/1998 | Sommer et al. | .................. | 106/403 |
| 5,854,320 A * | 12/1998 | Nakamura et al. | .................. | 524/48 |
| 5,971,646 A | 10/1999 | Chavatte et al. | .................. | 401/199 |
| 5,972,083 A * | 10/1999 | Iijima | .................. | 106/31.32 |
| 6,210,063 B1 | 4/2001 | Isobe et al. | .................. | 401/273 |
| 6,224,284 B1 | 5/2001 | Sukhna et al. | .................. | 401/198 |
| 6,254,297 B1 | 7/2001 | Frazier | .................. | 401/133 |
| 6,350,594 B1 * | 2/2002 | Clarke et al. | .................. | 435/72 |
| 6,402,412 B2 | 6/2002 | Sukhna et al. | .................. | 401/198 |
| 6,441,061 B1 * | 8/2002 | Ikai | .................. | 523/160 |
| 6,561,713 B2 | 5/2003 | Sukhna et al. | .................. | 401/198 |
| 6,786,956 B2 * | 9/2004 | Ichikawa | .................. | 106/31.43 |
| 6,890,584 B2 * | 5/2005 | Leenders et al. | .................. | 427/58 |
| 2001/0019682 A1 | 9/2001 | Sukhna et al. | .................. | 401/198 |
| 2003/0129015 A1* | 7/2003 | Sexton | .................. | 401/199 |

FOREIGN PATENT DOCUMENTS

| | | |
|---|---|---|
| CA | 1029144 | 4/1978 |
| EP | 0 761 785 A2 | 3/1997 |
| EP | 1 095 991 A1 | 5/2001 |
| EP | 1 118 643 A1 | 7/2001 |
| FR | 2212408 A * | 8/1974 |
| JP | 2000-129188 | 5/2000 |
| SU | 653317 | 8/1978 |
| WO | 0 001 778 A1 | 1/2000 |

OTHER PUBLICATIONS

Aldrich Catalog (1998-1999) pp. 283, 292, 747, 1217, and 1735.*
Aldrich Catalog (1989-1999) pp. 1125 and 1430.*
Lactol Spirits Material Safety Data Sheet [online]. [Retrieved May 3, 2006] Retrieved from the Internet <http://www.setonresourcecenter.com/msds/docs/wcd00045/wcd0454a.htm>.*
English Translation of CH 532651 (1973).*
Dri Mark Products Inc. v. National Ink Inc. and Dixon Ticonderoga Co., 01 Civ. 6541 (HB), 2002 U.S. Dist. LEXIS 6361 (S.D.N.Y. Apr. 11, 2002).
International Search Report for PCT/US02/36869, mailed Feb. 17, 2003.
International Search Report for EP 1095991, mailed Sep. 24, 2001.

* cited by examiner

*Primary Examiner*—Callie Shosho
(74) *Attorney, Agent, or Firm*—Marshall, Gerstein & Borun LLP

(57) ABSTRACT

A solvent system for an ink including a nitro solvent; an ink further including a film-forming resin, a pigment or dye, and, optionally, a substrate wetting agent; and a marking instrument containing the ink, are disclosed.

26 Claims, 1 Drawing Sheet

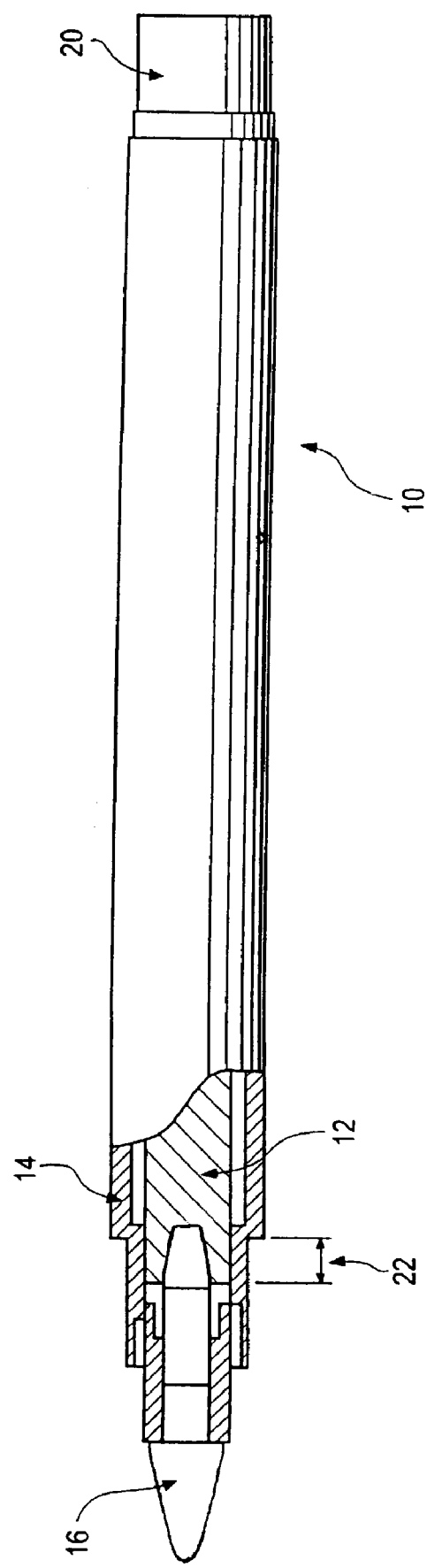

SOLVENT SYSTEM AND INK MADE THEREFROM

CROSS-REFERENCE TO RELATED APPLICATIONS

The benefit under 35 U.S.C. §119(e) of U.S. Provisional Patent Application Ser. Nos. 60/369,036, filed Apr. 1, 2002, and 60/403,828, filed Aug. 15, 2002, is hereby claimed.

BACKGROUND

1. Field of the Disclosure

The disclosure relates generally to solvent systems and inks made therefrom. More particularly, the invention relates to a solvent system including a nitro solvent and a hydrocarbon solvent. The solvent system is useful to create an ink including dyes or particulate matter which can be used in a capillary-action marker, for example.

2. Brief Description of Related Technology

Solvent systems for solvent-based inks such as permanent marker inks are typically selected to provide a balance of solvency for film-forming resins and colorants, which are the primary non-solvent components in inks. Typical solvent systems have primarily employed aromatic solvents such as xylene and/or toluene or various alcohols to provide the desired solvency, with inherent tradeoffs in color strength, durability, sensory characteristics (e.g., odor), and breadth of applications (e.g., ability to write on non-porous and/or wet surfaces).

Writing instruments for dispensing metallic inks have typically employed a hollow reservoir filled with free-flowing ink and mechanical means for mixing the ink to disperse the metallic particles. Without means to mix the metallic particles in the ink, the particles would tend to settle out of the liquid and clog the writing tip (nib) or lead to irregular dispensation. After mixing, the nib of the instrument would be repeatedly saturated with ink by opening a valve in the marker between the nib and the reservoir as the nib was depleted of ink. Such instruments are expensive, complicated to assemble, time-consuming and tedious in their operation, and prone to unreliability (e.g., leaking and/or clogging).

Another type of writing instrument for dispensing metallic ink via capillary action from a fiber reservoir has been disclosed; however, this writing implement is severely limited to construction with particular materials and limited by particular inks that can be used therewith. The improvement of any of the foregoing characteristics is a constant goal in the industry.

SUMMARY

One aspect of the invention is a solvent system for an ink including a hydrocarbon solvent and a nitro solvent.

Another aspect of the invention is an ink including the solvent system and a pigment or dye.

Another aspect of the invention is a marking instrument including a reservoir for storing ink joined in fluid communication with a porous nib and containing an ink according to the disclosure.

Further aspects and advantages may become apparent to those skilled in the art from a review of the following detailed description, taken in conjunction with the drawings. While the ink is susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWING

The sole FIGURE is a partially cut-away view of an example of a marker including a reservoir coupled by capillary action to a nib and including an ink according to the disclosure.

DETAILED DESCRIPTION

One embodiment of the invention is a solvent system for an ink including a hydrocarbon solvent and a nitro solvent.

The hydrocarbon solvent preferably is a liquid at room temperature. Preferably, the hydrocarbon solvent will include at least one $C_5$-$C_{15}$ hydrocarbon, more preferably at least one $C_6$-$C_{12}$ hydrocarbon. Examples include isoparaffins, cycloparaffins, and aliphatic hydrocarbons. Aliphatic hydrocarbons are preferred, and alkanes are more preferred. Examples of preferred alkanes include hexane, heptane, octane, nonane, decane, undecane, and dodecane.

The hydrocarbon solvent can also be a blend of chemicals, for example derived from petroleum. Thus, a preferred hydrocarbon solvent is characterized by a boiling point in the range of about 20° C. to about 300° C., preferably about 80° C. to about 200° C. Examples include mineral spirits and naphtha. Preferably, the hydrocarbon solvent will have low aromatic content, e.g., less than 35 percent by weight based on the total weight of the hydrocarbon solvent (wt. %), more preferably less than 10 wt. %, most preferably less than 1 wt. %. A preferred hydrocarbon solvent is naphtha or low aromatics (e.g., "Rule 66") mineral spirits (e.g., less than 1% aromatics), such as VM&P Naphtha 66 (CAS number 8032-32-4), available from Citgo Petroleum of Tulsa, Okla., having an evaporation rate of 1 (butyl acetate=1). The hydrocarbon solvent preferably has a medium evaporation rate (e.g., similar to butyl acetate), preferably from about 0.5 to about 3, more preferably about 0.8 to about 2.0.

The nitro solvent combines with the hydrocarbon solvent to provide suitable solvency for ink components, particularly resins. Nitro solvents include nitroparaffin solvents and nitrile solvents. Nitroparaffin solvents are preferred. Nitrile solvents include, for example, acetonitrile, adiponitrile, benzonitrile, n-butyronitrile, isobutyronitrile, malononitrile, propionitrile, valeronitrile. Acetonitrile, n-butyronitrile, and isobutyronitrile are preferred. Preferred nitro solvents have neutral odors and toxicity profiles. Preferably, the nitro solvent will have sufficiently low molecular weight to evaporate from a mark left by an ink at approximately room temperature. Thus, a nitro solvent preferably has a medium evaporation rate (e.g., similar to butyl acetate), preferably from about 0.5 to about 3, more preferably about 0.8 to about 2.0.

For an ink which is desired to write across wet surfaces or under water, the nitro solvent will be selected to be incompatible with water. For example, a solubility of water in the nitro solvent will be about 5 wt. % or less, preferably about 2 wt. % or less, for example 1 wt. % or less.

It is believed, without intending to be bound by any particular theory, that a nitroparaffin solvent can displace a monomolecular film of water present on a substrate and thereby promote formation and bonding of a continuous mark on a wet or moist surface. The nitroparaffin solvent can also displace a monomolecular film of water present on an aluminum particle and thereby deter degradation and loss of luster on metallic pigments such as aluminum. Therefore, an ink as disclosed herein that includes a metallic pigment will have excellent long-term stability and long-term metallic luster. A nitroparaffin is preferably one having a molecular weight less than about 150. Preferred nitroparaffin solvents are polar. Preferred nitroparaffins can generally be described by the formulae $C_nH_{2n+1}NO_2$ and $C_nH_{2n}NO_2X$, wherein n is an integer from 1 to 8 (more preferably 1 to 4) and X is selected from halogens (preferably chlorine) and $NO_2$. Such compounds include, for example, nitromethane, nitroethane, 1-nitropropane, 2-nitropropane, 1-nitrobutane, 2-nitrobutane, 1,3-dinitropropane and 1-chloronitropropane. The preferred nitroparaffins are nitropropane and nitroethane. Pure nitromethane can be shock sensitive, and preferably is blended with a higher nitroparaffin when used.

A suitable nitroparaffin solvent is a blend of nitroethane and 1-nitropropane having an evaporation rate, by volume, of 0.95 (n-butyl acetate=1), sold by Angus Chemical Company of Buffalo Grove, Ill., under the trade name NIPAR 820. This preferred nitroparaffin solvent has a vapor pressure of 12.4 mm Hg at 20° C., a specific gravity of about 1.01 at 20/20° C., a pleasant odor, a good toxicity profile, and a solubility of water in the solvent of about 0.6 wt. %.

Preferred nitro solvents can also be described by fractional solubility parameters $f_d$ (dispersion force contribution), $f_p$ (dipolar contribution), and $f_h$ (hydrogen bonding contribution), wherein $f_d+f_p+f_h=100$. A preferred nitro solvent will have a dipolar contribution fractional solubility parameter value in a range of about 36 to about 47. More specifically, a preferred nitro solvent will have solubility parameters $f_d$ of about 39 to about 52, $f_p$ of about 36 to about 47 and $f_h$ of about 12 to about 16. Most preferably, a nitro solvent will have solubility parameters $f_d$ of about 48 to about 52, $f_p$ of about 36 to about 40 and $f_h$ of about 12 to about 14.

The hydrocarbon solvent is blended with the nitro solvent to achieve suitable solvency characteristics for the ink components. A hydrocarbon solvent preferably is used in an amount at least 20 wt. % of an ink formulation. The hydrocarbon solvent preferably is used in an amount about 60 wt. % or less, to control odor characteristics. Most preferably, the hydrocarbon solvent is used in a range of about 30 wt. % to about 50 wt. %.

In another embodiment, one or more of an alcohol and an ester solvent is used in addition to, or in place of, the hydrocarbon solvent. The alcohol or ester can provide additional solubility for the resin used, particularly phenolic resins, and can primarily be selected based on solubility parameters and evaporation rate. Preferred alcohol solvents include 1-butanol and diacetone alcohol, most preferably 1-butanol. Preferred esters include amyl acetate and butyl acetate. Preferably, the alcohol or ester solvent will not contribute to softening of the resin in a mark made by the ink. When used, the alcohol or ester solvent preferably is used in an amount of about 5 wt. % to about 15 wt. %, more preferably about 7 wt. % to about 10 wt. %.

The nitro solvent preferably is used in an amount of about 20 wt. % to about 60 wt. %, more preferably about 25 wt. % to about 40 wt. %. As less nitro solvent is used, the odor of the hydrocarbon solvent becomes more apparent, whereas as more nitro solvent is used the solubility of the solvent blend for solvent dyes is enhanced.

If the ink is intended for use on wet surfaces or under water, then solvents with water compatibility should be avoided. For example, the resin could clog the tip of a marker because the organic solvent would dissolve into the water, leaving a water-insoluble resin at the tip.

In one embodiment, the ratio of hydrocarbon solvent to nitro solvent is in a range of about 0.3 to about 3, and preferably about 0.5 to about 1.2, for example about 0.75.

The overall combination of the hydrocarbon solvent and nitro solvent preferably will result in a solvent blend that has similar characteristics to aromatic hydrocarbon solvents such as xylene or toluene but without the offensive odor and other detrimental characteristics of such solvents. Accordingly, a preferred solvent blend will have a dipolar contribution fractional solubility parameter value in a range of about 4 to about 8. More particularly, a preferred solvent blend will have solubility parameters $f_d$ of about 78 to about 85, $f_p$ of about 4 to about 8 and $f_h$ of about 12 to about 14.

Thus, one aspect of the invention is an ink that includes about 5 wt. % or less of xylene and/or toluene, preferably 1 wt. % or less, or which is substantially free of xylene and/or toluene (e.g., included only as impurities). The solvent system disclosed herein can be used with the film-forming resins and colorants described herein in suitable amounts such as described herein, or can be substituted for all or part of an organic solvent system in another ink formulation. For example, the solvent system described herein can be substituted for xylene and/or toluene in known ink formulations to result in an ink having similar qualities but reduced offensive odor and toxicity.

The blend of the hydrocarbon solvent and nitro solvent preferably has a medium evaporation rate (e.g., similar to butyl acetate), preferably from about 0.4 to about 1.5, more preferably about 0.7 to about 1.2. When the evaporation rate decreases below about 0.4, the ink takes longer to dry on non-porous surfaces, whereas when the evaporation rate increases above about 1.5, the useful life of the marker in a cap-off condition becomes shorter. Lower evaporation rates, e.g., about 0.5 to about 1, are preferred for markers desired to have longer cap-off lifetimes. When used with metallic pigments subject to oxidation, such as aluminum pigments, the solvent will preferably have a very low water content. A preferred solvent vehicle for use with metallic pigments includes a mixture of a nitro-paraffin solvent and an alcohol solvent, and optionally a hydrocarbon solvent.

To form an ink suitable for delivery via a marking instrument (e.g., a capillary-action marker) a film-forming resin preferably is included the ink. In a solvent dye-based ink, the film-forming resin aids in providing a tinted mark that adheres to a substrate, such as a non-porous surface. In a pigmented system, the film-forming resin aids in drawing any particulate matter with the solvent vehicle as the ink is drawn to the marking tip via capillary action and dispensed upon marking (e.g. writing). The film-forming resin preferably forms a hard, glossy, dye-stained film on the substrate marked.

Any suitable film-forming resin may be used, including those known in the art. Preferred film-forming resins include maleic resins and phenolic resins. Other resins suitable for use in an ink as disclosed herein include, but are not limited to, acrylic resins, alkyd resins, amino resins, hydrocarbon resins, ketonic resins, polyamide resins, phenolic resins, polyester resins, polyurethane resins, rosins, and rosin-modified resins.

Phenolic resins are preferred for use in an ink containing dispersed particulate matter, such as a metallic pigment. Phenolic resins can be relatively non-reactive, quick drying, and resistant to weathering, alkalis, water, and abrasion. In addition, phenolic resins have good alcohol solubility and can provide excellent color retention and surface hardness. The basic raw materials of a phenolic resin include formaldehyde and phenol, although almost any reactive phenol or aldehyde can be used. Commercially-used phenols include phenol, cresols, xylenols, p-t-butylphenol, p-phenylphenol, bisphenols, and resorcinol. The aldehydes used include formaldehyde and furfural. A preferred thermosetting pure phenolic film-forming resin is sold by Lawter International of Pleasant Prairie, Wis., under the trade designation K-1111. This pure phenolic resin has a melting point of 140° C., an acid value of 75, a specific gravity of 1.07, and viscosity rating of Z6 (Gardner-Holdt; 60% in xylene), and is believed to be substantially fully cured. Thermosetting resins can be more suitable for marks which are intended to be subjected to high-temperature environments. Another preferred phenolic resin is a novolac (a.k.a. novolak) resin (a thermoplastic phenolformaldehyde resin obtained by the use of acid catalysts and excess phenol) sold by Georgia Pacific Resins, Inc. of Decatur, Ga., under the trade designation CK-2103.

A preferred resin for use in an ink containing a solvent-soluble dye is SYLVAPRINT 7200, available from Arizona Chemical Company of Jacksonville, Fla. (formerly UNIREZ 7200 from Union Camp Corporation), and is reported to be an acid-insoluble maleic resin having a softening point of 35° C. and acid value of 33.

As the resin load is reduced below about 3 wt. %, the permanence of the resulting mark is reduced, whereas as the resin load increases above about 35 wt. % the ink becomes more viscous. Thus, the film-forming resin preferably is included in an ink in a range of about 3 wt. % to about 35 wt. %, more preferably about 15 wt. % to about 20 wt. %, most preferably at least about 10 wt. %, for example greater than 8 wt. % or 9 wt. %. For an ink to be used in a capillary-action marker, the film-forming resin preferably is included in the ink in a range of about 10 wt. % to about 25 wt. %, more preferably about 15 wt. % to about 20 wt. %. When both a color pigment and another particulate pigment such as a metallic pigment are used, the amount of resin can be reduced (e.g., by up to about 5 wt. %) to maintain the viscosity of the ink within a useful range. The ratio of pigment (e.g., metallic and color pigment, if used) to resin is preferably in a range of about 0.5 to 1.7. The solvent system disclosed herein allows for surprisingly high resin-loading characteristics. Thus, whereas a typical ink employing xylene as a solvent can be limited to resin loadings up to about 6 wt. % or about 8 wt. %, an ink as disclosed herein can have much higher resin loading, resulting in a darker, more durable mark.

A colorant can be included in an ink to provide a visible mark. Suitable colorants include, but are not limited to, organic pigments and dyes such as solvent dyes, disperse dyes, and basic dyes, and are known in the art. Organic pigments include phthalo-blues (e.g., copper phthalocyanine), phthalo greens (e.g., chlorinated copper phthalocyanine), diarylide yellows (e.g., diarylanilide yellow; $C_{32}H_{26}Cl_2N_6O_4$), naphthol reds (e.g., azophloxine), and dioxazine violets (e.g., carbazole violet; $C_{34}H_{22}Cl_2N_4O_2$), for example. Such organic pigments are readily available as pre-dispersed mixtures. Basic dyes can be used, but some basic dyes could introduce bleeding when used under water or on wet substrates.

In one embodiment, solvent dyes are preferred. Solvent dyes are dyes that have at least some solubility in one or more organic solvents in which solvent the dye may be dissolved (e.g., a nitro solvent or a hydrocarbon solvent) and by which the dye may be carried to the substrate. Solvent dyes are completely or substantially immiscible in water. Solvent dyes are categorized and described more fully in the Colour Index International, 3rd ed. (1996). Mixtures of two or more solvent dyes can be used to provide virtually any desired color by regulating the proportions of the individual colorants therein.

Solvent dyes include, but are not limited to, azo dyes which includes monoazo, disazo and tetrazo's of both the metallized and non-metallized varieties; phthalocyanine derived dyes; and anthraquinones, including mono-, di- and mixed-substituted alkylamino derivatives as well as mono-, di- and mixed-substituted arylamino types. Specific examples include Solvent Black 3, CAS #4197-25-5; Solvent Black 7, CAS #8005-03-5; Solvent Brown 22; Solvent Violet 9, CAS #467-63-0; Solvent Blue 58; Solvent Blue 70, CAS#12237-24-0; Solvent Blue 100, CAS #71819-50-6; Solvent Orange 97, CAS #92257-04-0; Solvent Red 18; Solvent Red 49, CAS #509-34-2, and Solvent Red 160.

A colorant, particularly a solvent dye, preferably is included in the ink an amount in the range of about 1 wt. % to about 15 wt. %, preferably about 7 wt. % to about 13 wt. %, more preferably about 9 wt. to about 11 wt. %. Solvent dyes typically can be supplied as powders that include extenders (e.g., various salts) to standardize dye strength, therefore the values described herein are approximate. As the amount of colorant is decreased, the color strength of the resulting mark is reduced, whereas as the amount of colorant is increased, the viscosity of the ink and the potential for clogging in cap-off conditions (e.g., due to evaporation of solvent) are increased.

The solvent system described herein allows for surprisingly high colorant loading, which results in a strong, color-intense mark, particularly when high resin loadings are also used. The inks described below provided a higher color intensity than similar inks employing typical solvents (e.g., xylene and toluene).

Another embodiment is an ink that includes a dispersion of a metallic pigment and a film-forming resin in an organic solvent mixture such as that described herein. The metallic pigment can be a leafing (typically flaked) or non-leafing type. When a leafing pigment is used, the ink forms a layer of pigment parallel to the surface of the substrate, and is preferred when a highly-opaque mark with high metallic luster is desired (e.g., for use on dark paper). When a non-leafing pigment is used, the ink yields a less opaque mark with more of a glitter effect. The metallic pigment preferably is a metal pigment selected from the group consisting of aluminum, copper, bronze, oxides thereof, anodizes thereof (e.g., to provide an iridescent finish), and combinations of any of the foregoing. Suitable metal pigments are available from MD-Both Industries of West Chicago, Ill., for example. The metallic pigment is also defined to include non-metal lustrous substances that can provide a metallic or iridescent appearance, such as pearlescent agents (e.g., bismuth oxychloride (BiOCl)), which can be used in addition to, or instead of, a metal pigment.

The metallic pigment preferably has a particle size (e.g., an average particle size, more preferably median particle size, most preferably maximum particle size) less than about 8 µm, or in a range of about 2 µm to about 7.5 µm, more preferably in a range of about 2 µm to about 6 µm, for example about 4 µm to about 6 µm. Thus, for example, a metallic pigment having a median particle size of about 4 µm to about 6 µm can be used, and preferably the pigment will have a narrow distribution of particle sizes such that the maximum particle size does not lead to substantial clogging of the reservoir or the nib (e.g., such that dispensation of the ink is not interrupted and/or such that a majority of the ink in the reservoir can be dispensed).

The metallic pigment, when used, preferably is included in an ink in a range of about 7 wt. % to about 30 wt. %, and less when a color agent is used, such that the overall viscosity is suitable. When the metallic pigment is present in an amount less than about 7 wt. %, the resulting mark made when dispensed becomes weaker and less opaque, whereas when the amount of metallic pigment exceeds about 30 wt. %, the ink can tend to become viscous and difficult to dispense from a capillary marker. In one embodiment, the metallic pigment is present in an amount less than 10 wt. %, for example 9.75 wt. %. Non-leafing pigments are preferred when a color agent is used in the ink. A preferred aluminum pigment for use in an ink according to the invention that provides a leafing effect is sold as a 65 wt. % solids paste in mineral oil under the brand name METAGLOSS 1500 by MD-Both Industries, and has a median particle diameter (D50) of 4.0 μm to 6.0 μm. The METAGLOSS aluminum pigment is surface treated with stearic acid. Such a pigment can be used as supplied in mineral oil, or the mineral oil can be substituted in the ink with another carrier, such as a resin solvent. Optionally, metallized pigment in solid (e.g., pellet) form can be dispersed in the organic solvent vehicle.

When a color agent is included in the ink to tint the metallic pigment, then preferably an organic pigment is used and a linking agent is added to the dispersion to associate the color with the metallic pigment. For example, a yellow pigment can be used with an aluminum metallic pigment and, preferably, a suitable linking agent, to provide a metallic pigment that appears gold. When used with a metallic pigment, a color agent preferably is included in an ink in a range of about 2 wt. % to about 30 wt. %, more preferably about 7 wt. % to about 25 wt. %.

A suitable linking agent will associate a color agent with a metallic pigment particle to override preferential absorption of the pigment by the substrate to be marked (e.g., paper). For example, a linking agent having a polar end and a non-polar end can link a non-polar pigment to a polar metal surface (e.g., the metallic pigment). Preferred linking agents are selected from a group consisting of amphiphilic copolymers, multifunctional carbodiimides, phosphoric acid salts, and combinations thereof. A suitable amphiphilic copolymer (having both hydrophobic and hydrophilic units) is a poly(vinylpyrrolidone/acrylates/lauryl methacrylate) sold under the trade name STYLEZE 2000 (CAS #831 by International Specialty Products of Wayne, N.J. A preferred multifunctional carboduimide is sold under the trade name UCARLNK XL-29SE by Union Carbide Corp. of Danbury, Conn. Monoethanolamine phosphate is a preferred phosphoric acid salt. Other agents useful in promoting adherence of organic pigments to metallic substrates (e.g., agents used in inks for printing on metallized films) may also be useful as a linking agent in an ink according to the invention. The linking agent preferably is present in an amount in a range of about 0.1 wt. % to about 2 wt. %, for example about 0.3 wt. % to about 1 wt. % when using a monoethanolamine.

Various optional components typical for use in solvent inks may find use in the ink described herein. Such optional components include, but are not limited to, surfactants, alcohol co-solvents, and rheology modifiers.

A preferred optional component for use in an ink as described herein is a substrate wetting agent, which functions to wet out and reduce the contact angle of the ink on the substrate to provide a smooth, continuous mark. Organosilicone surfactants (e.g., siloxanes) are preferred substrate wetting agents, and are available under the trade name SILWET from Witco Chemical. A preferred organosilicone surfactant is SILWET L-7001, available from Witco Chemical Company.

Other organosilicone surfactants include, but are not limited to, ACTION 99 distributed by Growmark Inc. (polyalkyleneoxide modified heptamethyltrisiloxane and nonionic surfactants); CLASS CELOXONE by Class—Cenex (nonionic silicone surfactant); CLASS SILKIN by Class—Cenex (nonionic silicone surfactant); ETH-N-GARD by Wilfarm, L.L.C. (heptamethyltrisiloxane and ethylated seed oil); EXCEL 2000 by Coastal Chemical Corp. (polyether polymethylsiloxane copolymer); FREEWAY by Loveland Industries (silicone polyether co-polymer and alcohol ethoxylates); IMPACT by Jay-Mar, Inc. (proprietary blend of polyalkyleneoxide, modified heptamethyltrisiloxane and nonionic surfactants); KINETIC by Helena Chemical Co. (proprietary blend of polyalkyleneoxide modified polydimethylsiloxane and polyoxypropylene-polyoxyethylene block copolymers); KINETIC DC by Helena Chemical Co. (blend of EO/PO block copolymers and organosilicone surfactants); KINETIC HV by Helena Chemical Co. (proprietary blend of polyalkyleneoxide modified polydimethylsiloxane and polyoxypropylene-polyoxyethylene block copolymers); MATRIXX by Coastal Chemical Corp. (polymethylsiloxane copolymer and polyethoxy ethers); MOTION by Loveland Industries (silicone polyether co-polymer and alcohol ethoxylates); RAIN-FAST by Conklin Co., Inc. (polyetherpolymethylsiloxane-copolymer, organic surfactants and anti-foaming agent); RAPID SPREAD by Cannon Packaging Co. Inc. (premium surfactant plus silicone); SIL ENERGY by Brewer International ("Organosilicones"); SIL-FACT HV by Drexel Chemical Co. (blend of organosilicone surfactant and alcohol ethoxylates); SILKIN by Riverside—Cenex (polyalkyleneoxide modified heptamethyltrisiloxane and nonionic surfactants); SIL-MES by 100 Drexel Chemical Co. (blend of organosilicone, methylated seed oil, alcohol ethoxylate and NITS); SILWET L-77 by Helena Chemical Co. (polyalkyleneoxide modified heptamethylsiloxane); SPEED by Precision Labs, Inc. (proprietary blend of polyether polydimethyl siloxane copolymers); SYLGARD 309 by Wilfarm, L.L.C. (heptamethyltrisiloxane); THOROUGHBRED by Estes, Inc. (propietary blend of polyalkyleneoxide, modified polydimethylsiloxane and non-ionic surfactants); and TEGO by Goldschmidt Chemical Company.

A substrate wetting agent, when used, preferably will be added in an amount of about 0.1 wt. % to about 2 wt. % of the ink formulation, preferably about 0.3 wt. % to about 0.8 wt. %, for example 0.5 wt. %.

The solvents, film-forming resin, pigments or colorants, and other additives will be used in amounts sufficient to provide an ink with the desired color and stability. For use in a capillary action marker, the ink will have a suitable viscosity matched to the capillarity of the marker components. Thus, for a capillary-action marker the ink will have a viscosity less than about 10 centipoise (cP), and generally in a range of about 1.7 cP to about 8 cP, more preferably about 6 cP or less, most preferably about 2 cP to about 6 cP. When a metallic pigment is used, the viscosity is preferably about 3 cP or less.

An ink according to the disclosure can be formulated to provide an intense, glossy mark on non-porous surfaces, wet surfaces, oily surfaces, and even under water. Furthermore, an ink according to the disclosure can be formulated to provide such characteristics without offensive odors or a negative toxicity profile.

An ink as disclosed herein can be prepared by standard ink processing methods. For example, an ink as disclosed herein can be prepared by thoroughly blending the film-forming resin, colorant, solvents, and optional additives until a homogenous mixture is formed. Resin and/or colorant masterbatches may be used. When a metallic pigment is used, preferably it is dispersed in a first solvent or a first portion of a solvent mixture at low shear and low temperature, the film-forming resin is dissolved in a second solvent or a second portion of a solvent mixture with heat and then cooled, and then the two mixtures are combined and blended. In one expedient, a masterbatch of resin dissolved in solvent can be prepared and cooled in advance of ink preparation and blended with the metallic pigment prior to filling ink reservoirs.

A marker according to the invention generally includes a reservoir for storing ink joined in fluid communication with a porous nib. A capillary-action marker according to the invention preferably includes a porous reservoir for storing ink joined in capillary coupling relation to a porous nib. The figure is a partially cut-away view of an example of a marker 10 according to the invention including a porous reservoir 12 disposed in a barrel 14 and coupled by capillary action to a pointed nib 16. The barrel 14 is sealed by a plug 20, which can aid in keeping the reservoir in place and preventing evaporation of the solvent. By capillary coupling it is meant that the reservoir and nib are disposed in such a manner to permit transfer of ink between the reservoir and nib via capillary action, for example at a coupling zone 22, such that a change in pressure (either at the nib or in the reservoir) can pull ink across an interface between the two elements. Preferably, a marker according to the invention includes an ink according to the disclosure and a porous fiber nib. The barrel is constructed of a material that is compatible with the particular solvent mixture used, such as metal, nylon, and, in some cases, polypropylene or other polymers.

The reservoir can be an open volume for holding a free-flowing ink or can be constructed of a porous material, preferably linear fiber material, such as linear polyester fiber. Other reservoir materials include felts, cellulose acetate, and other fibers compatible with the solvent system (e.g., not solvated or swollen by the solvent system). A porous reservoir should have sufficient porosity to prevent substantial filtering of any particulate matter, if present, as the ink is drawn through and out of the reservoir. Voids in the reservoir preferably have substantially linear pathways (e.g., low crimp) because a tortuous pathway can contribute to holdup and filtering of particulates.

The density of a reservoir, such as a fiber reservoir, can serve as an approximation of the degree of porosity of the reservoir. When an ink as described herein that includes a particulate pigment is used, then the density of the reservoir preferably is about 140 mg/cm$^3$ or less, more preferably about 110 mg/cm$^3$ or less, forqg example about 100 mg/cm$^3$. When a metallic pigment having a median particle size of about 4 μm to about 6 μm is used, then the reservoir preferably has a density less than about 120 mg/cm$^3$, more preferably about 100 mg/cm$^3$ or less. When a fiber is used, the fiber will preferably have a denier-per-fiber (dpf) value of about 6 or less, more preferably in a range of about 1 dpf to about 4 dpf, for example about 3 dpf. The reservoir material can be modified (e.g., plasma or corona treatment) to provide a desired surface energy. Suitable polyester fiber reservoirs are available from Filtrona Richmond, Inc., of Richmond, Va., such as No. 22868 polyester fiber reservoir having a density of 103 mg/cm$^3$, wrapped in an extruded polypropylene film.

The size and shape of the reservoir is limited, in part, by the physical dimensions of the marking instrument. In one preferred embodiment suitable for use in a conventional-sized cylindrical marker for hand application, the reservoir preferably is about 5 mm to about 15 mm in diameter and about 70 to about 120 mm in length. A reservoir according to the invention can be provided with an outer wrapper to assist in defining the shape of the reservoir and provide convenience in handling characteristics. Thus, for example, a polyester fiber reservoir can be wrapped in a plastic (e.g., polypropylene or polyester) film to define a cylindrical shape wherein at least one end of the reservoir is exposed (i.e., not covered by the wrapper). The invention is not limited to the use of any particular size or shape of reservoir, and other suitable reservoir sizes and shapes can be selected by a person of ordinary skill in the art. For example a porous reservoir shape can include one or more indentations for forming an air vent passage between the reservoir and the barrel:

The reservoir preferably includes an ink as disclosed herein. In one embodiment, the reservoir includes a film-forming resin and a solvent dye in an organic solvent vehicle including a hydrocarbon solvent and a nitro solvent, optionally together with a substrate wetting agent. In another embodiment, the reservoir includes a dispersion of a metallic pigment and a film-forming resin in an organic solvent vehicle, optionally together with a color agent, with or without a linking agent. The ink can be loaded into a reservoir via a single-orifice needle, dispensing ink as the needle is drawn through the reservoir, for example. Optionally, a needle having multiple orifices can be used, wherein the needle penetrates the reservoir, ink is injected in a single step, and then the needle is withdrawn. The reservoir and/or resulting marker can be centrifugated to aid in dispersing the ink.

The nib can be constructed of any suitable material, such as nylons, polyesters, and acrylics. The nib is sufficiently porous to provide an ink path that will not substantially filter any particles if present in the ink. Preferably, the porosity of the nib is in a range of about 40% by volume to about 80% by volume of voids, more preferably about 55% by volume to about 75% by volume.

In an embodiment wherein a solvent dye is used, the nib preferably is constructed of nylon. Suitable linear acrylic fiber/melamine resin materials for use as nibs are available from Teibow Hanbai Co., Ltd. of Tokyo, Japan (e.g., under the designation ACE-546V; 62% porosity) and from Aubex Corp. of Tokyo, Japan under the designations HA45N and WA45P.

In an embodiment wherein a metallic pigment is used, the nib preferably is constricted of porous, substantially linear acrylic fiber. Acrylic nibs have outstanding solvent resistance, a hard writing touch despite high porosity, and good abrasion resistance. When using a metallic pigment with a nominal average particle size in the range of about 4 μm to about 6 μm, the nib preferably has a porosity of at least about 55% by volume, preferably about 60% by volume of voids. Suitable high porosity, substantially linear acrylic fiber/melamine resin materials for use as nibs are available from Teibow Hanbai Co., Ltd. of Tokyo, Japan under the designations ACE-346V (66.3% porosity), ACE-446V (63.8% porosity), and ACE-546V (62% porosity) and from Aubex Corp. of Tokyo, Japan under the designations HA45N and WA45P. Use of an acrylic nib with a metallic ink as disclosed herein ensures adequate function and useful service life of the article by promoting chemical compatibility and suppressing blockage of the capillary passages at the surface of the nib via filtration of large pigment particles.

The size and shape of the nib will be guided, in part, by the size and shape of the reservoir and by practical considerations. Thus, for example, the writing end of the nib can have a chisel-point shape, useful for making broad or narrow marks. The opposite end of the nib, which is disposed in capillary coupling relation to the reservoir (i.e., at the coupling zone 22 in the figure), preferably has a cross-sectional dimension (e.g., diameter) that is at least about ⅓ of the cross-sectional dimension of the reservoir, more preferably at least about ½ the dimension or substantially the same dimension as the reservoir, to facilitate drawing ink from substantially the entire cross-section of the reservoir.

EXAMPLES

The following examples are provided to illustrate the invention but are not intended to limit the scope of the invention.

Example 1

Black Ink

A black ink was prepared with the ingredients identified below in the amounts shown.

| Component | Function | Amount |
|---|---|---|
| NIPAR 820 | solvent | 42.0 wt. % |
| kM SYLVAPRINT 7200 | film-forming resin | 18.0 wt. % |
| VM&P naphtha 66 | solvent | 30.5 wt. % |
| RM Oil Black HZ (Colour Index Solvent Black 3) | colorant | 5.7 wt. % |
| RM Oil Brown 54 (Colour Index Solvent Brown 22) | colorant | 3.3 wt. % |
| RM Silicone L7001 | substrate-wetting agent | 0.5 wt. % |

The ink had a measured solids content of 29.1 wt. %, a specific gravity of 0.93, a surface tension (DuNuoy method on a Cahn Model DCA-312) of 22.8 dynes/cm, a viscosity (@200 rpm with SC-18 spindle at 25° C.) of 3.8 cP, and a VOC of 678.9 grams per liter (g/l). The ink was subjected to an accelerated aging test at 50° C. for four weeks, and showed no change in stability. Accordingly, the ink is expected to be stable for at least three years under normal usage.

The ink was loaded into a capillary-action marker including an acrylic nib and a polyester fiber reservoir. The marker wrote on wet surfaces, on oily surfaces, and under water, and left a dark black, glossy mark when applied to a substrate.

Example 2

Red Ink

A red ink was prepared with the ingredients identified below in the amounts shown.

| Component | Function | Amount |
|---|---|---|
| NIPAR 820 | solvent | 41.0 wt. % |
| RM SYLVAPRINT 7200 | film-forming resin | 18.0 wt. % |
| VM&P naphtha 66 | solvent | 29.5 wt. % |
| Neozapon Red 365 (Colour Index Solvent Red 160) | colorant | 7.0 wt. % |
| Oil Scarlet 308 (Colour Index Solvent Red 18) | colorant | 4.0 wt. % |
| RM Silicone L7001 | substrate-wetting agent | 0.5 wt. % |

The ink had a measured solids content of 31.8 wt. %, a specific gravity of 0.944, a surface tension (DuNuoy method on a Cahn Model DCA-312) of 22.6 dynes/cm, a viscosity (@200 rpm with SC-18 spindle at 25° C.) of 5.3 cP, and a VOC of 670.24 g/l. The ink was subjected to an accelerated aging test at 50° C. for four weeks, and showed no change in stability. Accordingly, the ink is expected to be stable for at least three years under normal usage.

The ink was loaded into a capillary-action marker including an acrylic nib and a polyester fiber reservoir. The marker wrote on wet surfaces, on oily surfaces, and under water, and left a intensely red, glossy mark when applied to a substrate.

Example 3

Blue Ink

A blue ink was prepared with the ingredients identified below in the amounts shown.

| Component | Function | Amount |
|---|---|---|
| NIPAR 820 | solvent | 39.0 wt. % |
| RM SYLVAPRINT 7200 | film-forming resin | 18.0 wt. % |
| VM&P naphtha 66 | solvent | 32.5 wt. % |
| Spectra Oil Blue ZV (Colour Index Solvent Blue 58) | colorant | 5.0 wt. % |
| Spectrasol Blue FLE (Colour Index Solvent Blue 70) | colorant | 5.0 wt. % |
| RM Silicone L7001 | substrate-wetting agent | 0.5 wt. % |

The ink had a measured solids content of 29.1 wt. %, a specific gravity of 0.924, a surface tension (DuNuoy method on a Cahn Model DCA-312) of 23.0 dynes/cm, a viscosity (@200 rpm with SC-18 spindle at 25° C.) of 3.9 cP, and a VOC of 665.28 g/l. The ink was subjected to an accelerated aging test at 50° C. for four weeks, and showed no change in stability. Accordingly, the ink is expected to be stable for at least three years under normal usage.

The ink was loaded into a capillary-action marker including an acrylic nib and a polyester fiber reservoir. The marker wrote on wet surfaces, on oily surfaces, and under water, and left a dark blue, glossy mark when applied to a substrate.

Example 4

Silver Ink

A silver ink was prepared with the ingredients identified below in the amounts shown.

| Component | Function | Amount |
|---|---|---|
| METAGLOSS 1500 | metallic pigment | 15 wt. % |
| NIPAR 820 | solvent | 30 wt. % |

-continued

| Component | Function | Amount |
|---|---|---|
| VM&P naphtha 66 | solvent | 30 wt. % |
| Phenolic resin K-1111 | film-forming agent | 15 wt. % |
| 1-butanol | solvent | 10 wt. % |

The resin was dissolved in the naphtha and 1-butanol under heat, and then cooled. The aluminum powder paste was dispersed in the nitro-paraffin solvent, and then the two mixtures were combined.

The ink was loaded via a single-orifice syringe into a Filtrona-Richmond No. 22868 polyester fiber reservoir (7.9 mm in diameter; 93.2 mm in length). The reservoir was coupled to a Teibow aCE-346V acrylic nib (4.24 mm diameter head; 3.25 mm diameter shank, tapering to approximately 3 mm; and 30.5 mm in length). The reservoir was wrapped in a polypropylene film, and included two depressions along the length of the reservoir to facilitate venting of air to the rear of the filter (opposite the tip of the nib). The nib was pressed into the reservoir to result in a penetration-type fit between the nib and polyester fiber material. The reservoir and nib were loaded into a nylon barrel marker. The marker dispensed the metallic ink from the reservoir, through the nib, onto a substrate via capillary action and laid down an opaque mark with a lustrous silver appearance.

The foregoing description is given for clearness of understanding only, and no unnecessary limitations should be understood therefrom, as modifications within the scope of the invention may be apparent to those having ordinary skill in the art. For example, the solvent system disclosed herein can be combined with suitable dyes and/or pigments to formulate inks suitable for use in gravure printing, flexographic printing, lithographic printing, screen printing, jet printing, and other coating applications.

What is claimed is:

1. A capillary-action marker comprising an ink comprising about 20 weight percent (wt. %) to about 60 wt. % of a nitro solvent, about 30 wt. % to about 50 wt. % of an aliphatic hydrocarbon solvent, a film-forming resin, and one or more of a pigment and a dye, wherein the ink is disposed in a porous reservoir joined in capillary coupling relation to a porous nib.

2. The marker of claim 1, wherein the nitro solvent is a nitroparaffin selected from the formulae $C_nH_{2n+1}NO_2$ and $C_nH_{2n}NO_2X$, wherein n is an integer from 1 to 8 and X is selected from halogens and $NO_2$.

3. The marker of claim 1, wherein the film-forming resin is present in an amount at least about 10 wt. %.

4. The marker of claim 1, the ink comprising from 0 wt. % to about 5 wt. % of a solvent selected from the group consisting of xylene, toluene, and any mixture thereof.

5. The marker of claim 1, the ink further comprising one or more of an alcohol and an ester solvent in a range of about 5 wt. % to about 15 wt. %.

6. The marker of claim 1, the ink comprising about 1 wt. % to about 15 wt. % of a solvent dye.

7. The marker of claim 1, the ink further comprising an organosilicone surfactant substrate wetting agent.

8. The marker of claim 1, wherein said ink comprises a metallic pigment and said nib comprises porous, substantially linear acrylic fiber.

9. The marker of claim 1, wherein said ink comprises a solvent dye and said nib comprises nylon fiber.

10. The marker of claim 1 wherein said pigment comprises one or both of a copper pigment and a bronze pigment.

11. The marker of claim 10, wherein said pigment comprises a bronze pigment.

12. The marker of claim 1, wherein the film-forming resin is present in a range of about 3 wt. % to about 35 wt. %.

13. The marker of claim 1, wherein the ink has a viscosity less than about 10 centipoises (cP).

14. An ink comprising about 20 wt. % to about 60 wt % of a nitro solvent, an aliphatic hydrocarbon solvent, a film-forming resin selected from the group consisting of maleic resins and phenolic resins, and one or more of a pigment and a dye.

15. The ink of claim 14, wherein the film-forming resin is a phenolic resin and the ink further comprises a metallic pigment.

16. A capillary-action marker comprising an ink comprising about 20 wt. % to about 60 wt. % of a nitro solvent, aliphatic hydrocarbon solvent, a film-forming resin, one or more of a pigment and a dye, and a metallic pigment, wherein the ink is disposed in a porous reservoir joined in capillary coupling relation to a porous nib.

17. The marker of claim 16, the ink further comprising a linking agent selected from the group consisting of amphiphilic copolymers, multifunctional carbodiimides, phosphoric acid salts, and combinations thereof.

18. The marker of claim 17, wherein said linking agent is monoethanolamine phosphate.

19. The marker of claim 16, wherein the metallic pigment has a median particle size less than about 8 μm and is present in an amount of about 7 wt. % to about 30 wt. %.

20. The marker of claim 16, wherein said metallic pigment comprises one or both of a copper pigment and a bronze pigment.

21. The marker of claim 16, wherein the ink has a viscosity less than about 10 centipoises (eP).

22. An ink comprising about 20 wt. % to about 60 wt. % hydrocarbon solvent, about 20 wt. % to about 60 wt. % nitro solvent, about 3 wt. % to about 35 wt. % of a maleic resin, about 1 wt. % to about 15 wt. % of a solvent dye, and about 0.1 wt. % to about 2 wt. % of an organosilicone surfactant substrate wetting agent.

23. A metallic ink comprising about 20 wt. % to about 60 wt. % hydrocarbon solvent, about 20 wt. % to about 60 wt. % nitro solvent, about 5 wt. % to about 15 wt. % of an alcohol solvent, about 3 wt. % to about 35 wt. % of a phenolic resin, and about 7 wt. % to about 30 wt. % of a metallic pigment.

24. The ink of claim 23, further comprising an organic pigment in a range of about 2 wt. % to about 30 wt. % and a linking agent.

25. A capillary-action marker comprising an ink comprising about 20 wt. % to about 60 wt. % of a nitro solvent, a film-forming resin, from 0 wt. % to about 5 wt. % of a solvent selected from the group consisting of xylene, toluene, and any mixture thereof and one or more of a pigment and a dye, wherein the ink is disposed in a porous reservoir joined in capillary coupling relation to a porous nib.

26. The marker of claim 25, wherein the ink has a viscosity less than about 10 centipoises (cP).

* * * * *

UNITED STATES PATENT AND TRADEMARK OFFICE
CERTIFICATE OF CORRECTION

PATENT NO. : 7,297,729 B2
APPLICATION NO. : 10/404075
DATED : November 20, 2007
INVENTOR(S) : Martin N. Sexton et al.

It is certified that error appears in the above-identified patent and that said Letters Patent is hereby corrected as shown below:

In the Claims:

At Column 14, line 3, "claim 1" should be -- claim 1, --.

At Column 14, lines 21-22, "solvent, aliphatic" should be -- solvent, an aliphatic --.

At Column 14, line 39, "(eP)" should be -- (cP) --.

At Column 14, line 60, "thereof" should be -- thereof, --.

Signed and Sealed this

Thirty-first Day of March, 2009

JOHN DOLL
*Acting Director of the United States Patent and Trademark Office*